Nov. 24, 1931.  W. L. HANCOCK  1,833,251
CIRCULAR SAW TOOTH GAUGE
Filed March 22, 1929
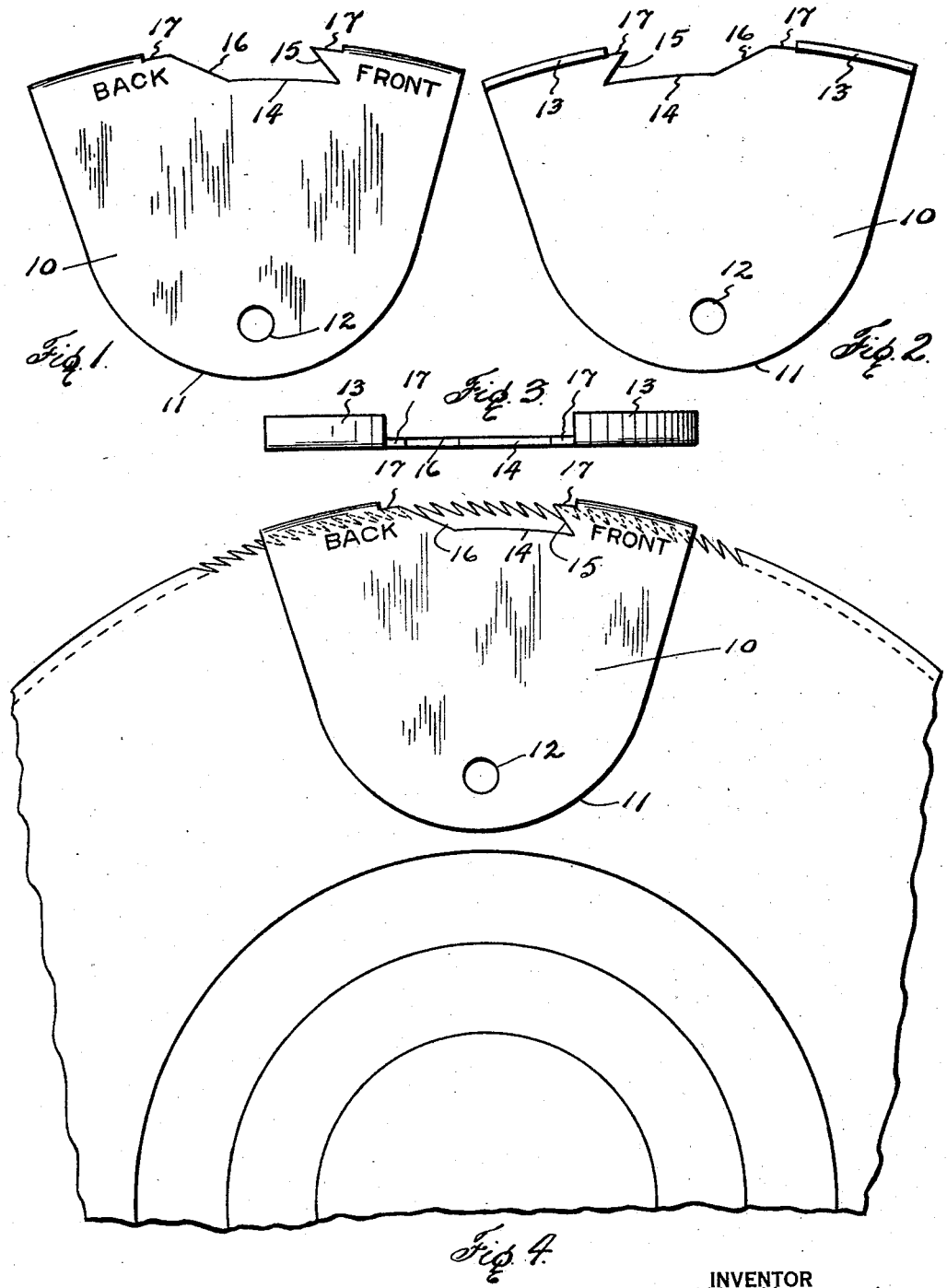

Patented Nov. 24, 1931

1,833,251

UNITED STATES PATENT OFFICE

WILLIAM L. HANCOCK, OF DALLAS, TEXAS, ASSIGNOR TO THE MURRAY COMPANY, OF DALLAS, TEXAS, A CORPORATION OF TEXAS

CIRCULAR SAW TOOTH GAUGE

Application filed March 22, 1929. Serial No. 349,053.

This invention relates to new and useful improvements in circular saw tooth gauges.

One object of the invention is to provide an improved gauge for the teeth of circular saws for accurately determining when the front and back edges of the teeth have been cut, filed or ground to the proper inclination.

A further object of the invention is to provide a gauge which may be brought into intimate contact with the saw teeth and readily slid on the periphery of said saw in successively testing the teeth.

Another object of the invention is to provide a saw tooth gauge particularly adapted for use in gauging gang circular saws where said saws have spacer members therebetween which occupy a portion of the space between each pair of saws.

Further reference will be made herein to the foregoing and other features of the invention, which will be more particularly pointed out.

In the following specification an exemplification of the invention is set forth and this is illustrated in the accompanying drawings in which:

Fig. 1 is a front elevation of a saw gauge constructed in accordance with the invention, Fig. 2 is a rear elevation of the same, Fig. 3 is a plan view of the gauge, and Fig. 4 is an elevation of a portion of a circular saw and the spacer member thereof showing the gauge positioned thereon.

In the drawings the numeral 10 designates a flat metal plate of which the body of the gauge is formed. This plate is preferably, but not necessarily, given a general sector shape with the end 11 rounded for convenience in handling. The rounded end of the plate is provided with an aperture 12 for hanging the gauge on a nail or similar support when not in use.

Lips or lugs 13 are bent from the opposite end of the plate on each side of an intermediate gap or notch 14. These lips are bent at substantially right angles to the side of the plate and the bend is made upon an arc having substantially the same radius as the periphery of the saw on which the gauge is to be used. By this arrangement the lips may rest upon the teeth of the saw as is shown in Fig. 3 and the plate 10 will lie in contact with the side of the saw, thus permitting the gauge to be freely moved circumferentially of said saw.

The gap 14 has an overhanging gauge edge 15 at one end and an inclined gauge edge 16 at its opposite end. The lips 13 are cut back from the edges 15 and 16, thus exposing the arcuate edges 17 of the plate and providing sharp intersections between said edges and the edges 15 and 16.

The edge 15 is cut at the proper angle for the front edge of the saw tooth, while the edge 16 is inclined at the proper angle for the back edge of the saw tooth. When the gauge is placed on the saw as is shown in Fig. 3, it may be readily slid on the teeth so as to aline the edges of the teeth with the edges of the gap, whereby the operator may observe whether or not the tooth has been filed or dressed to the proper angle.

The front edge of a given tooth may be readily tested by registering the edge 15 therewith and observing the variance, if any, of the two edges. A similar test may be made by registering the back edge of the tooth with the edge 16 and observing the variance, if any. The sharp intersections between each edge 17 and its correlated edge 15 or 16 should register with the points of the teeth and defective points may thus be easily discerned.

The gauge is easily and quickly used and its rounded end 11 terminating short of the spacer member between the saws permits the gauge to be freely moved circumferentially on each saw. The gap is deep enough and sufficiently wide to expose a number of teeth in a clear line of vision.

Various changes in the size and shape of the different parts, as well as modifications and alterations, may be made within the scope of the appended claim.

What I claim, is:

A saw gauge comprising a single, one piece plate having at least one plane, unobstructed surface, a pair of spaced free edged lips provided at one edge of the plate and extending outwardly from said surface for supporting the plate on the toothed edge of a saw, a portion of the plate intermediate the lips being recessed to form a gap substantially deeper than the teeth of the saw to be gauged, the edges of the plate at opposite ends of the gap being shaped to define the form of the back and the front edges respectively of a tooth to be gauged, the plate at each opposite margin of the gap inwardly of each of the supporting lips being provided with a free upper edge fixed at the plane of the under surface of the lips for gauging the height of a tooth.

In testimony whereof I affix my signature.

WILLIAM L. HANCOCK.